Aug. 5, 1947.  G. L. USSELMAN  2,425,165
STABILIZED HARMONIC OSCILLATOR
Filed May 15, 1943
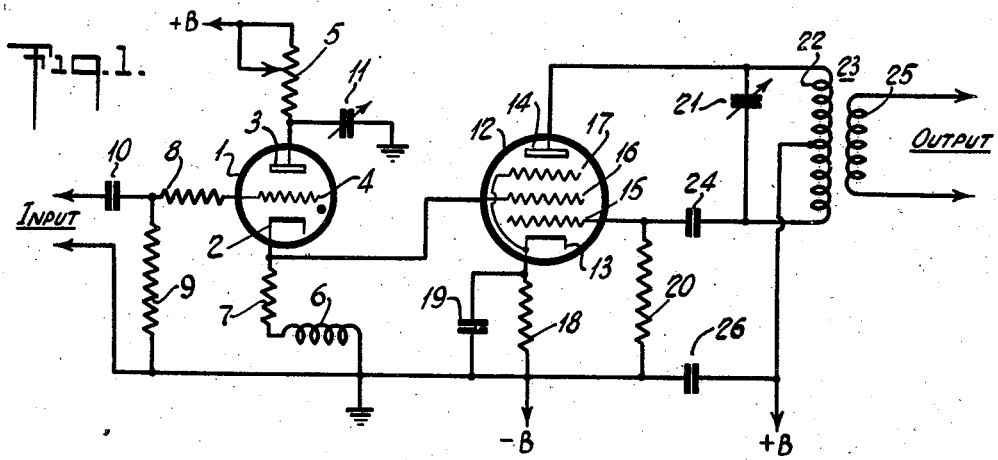
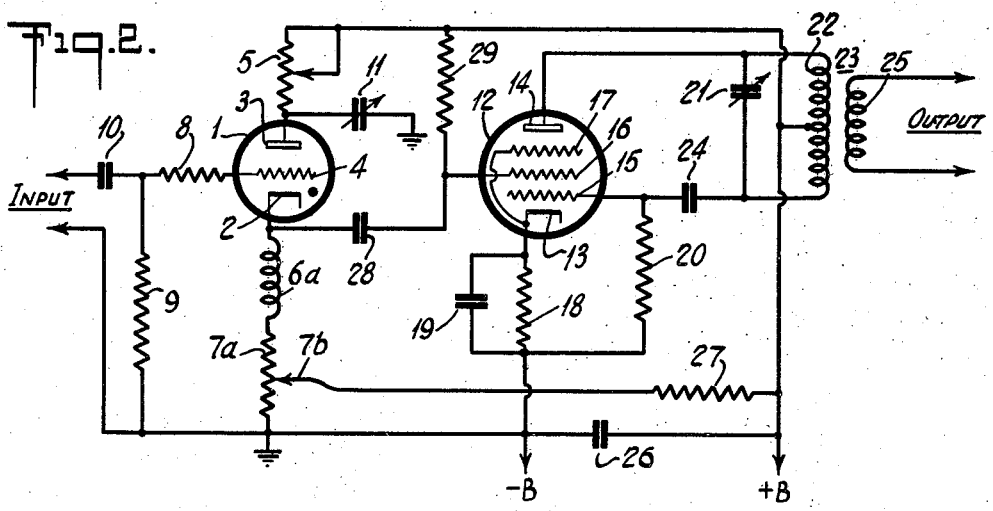
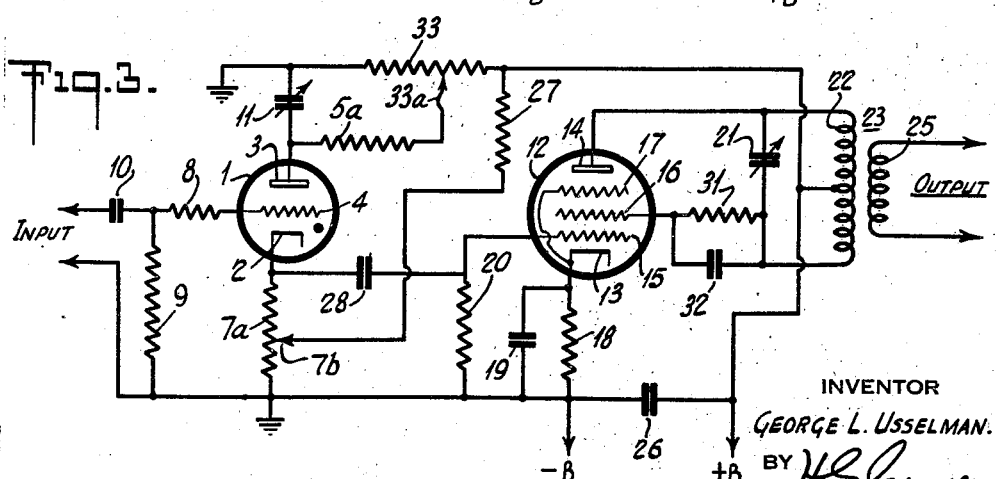
INVENTOR
GEORGE L. USSELMAN.
BY H. S. Grover
ATTORNEY Patented Aug. 5, 1947

2,425,165

UNITED STATES PATENT OFFICE 2,425,165

STABILIZED HARMONIC OSCILLATOR

George L. Usselman, Port Jefferson, N. Y., assignor to Radio Corporation of America, a corporation of Delaware Application May 15, 1943, Serial No. 487,095

10 Claims. (Cl. 250—36)

This invention relates to electronic oscillators in general, and in particular to stabilized harmonic oscillators. The field of utility for such oscillators may be appreciated from the fact that it is frequently necessary to generate a relatively high frequency under control of an excitation frequency with respect to which it has a harmonic relation.

A conventional method of obtaining harmonics of a fundamental frequency is by means of one or more frequency multiplier stages. This method has the disadvantage that a considerable number of tubes is required and the output is at low efficiency.

Accordingly, it is an object of my invention to provide means for stabilizing the frequency of an oscillator by a relatively low frequency of excitation input energy, use preferably being made of a gaseous discharge tube for delivering a peaked excitation wave to an oscillator stage.

My invention may be carried out in various ways and by the adoption of circuit arrangements which differ more or less one from another. However, three illustrative embodiments of the invention will be set forth in the description to follow. This description is accompanied by a drawing, in which:

Fig. 1 illustrates one form of the invention using a gaseous discharge tube, a pentode vacuum tube, and associated circuit arrangements.

Fig. 2 illustrates a modification in which certain of the impedance elements of the circuit arrangement are made alternative to those of Fig. 1; and Fig. 3 illustrates still another form of the invention in which the circuit parameters of the gaseous and vacuum tubes are further modified.

Referring first to Fig. 1, I show a gaseous tube 1 which may be of the triode type having a cathode 2, an anode 3, and a control grid 4. The anode 3 is supplied with positive D. C. potential, the value of which may be adjusted by means of a potentiometer 5. The grounded negative terminal of the D. C. source, indicated as —B, is connected to the cathode 2 through a series circuit including a choke 6 and a cathode resistor 7. The grid 4 is connected to ground through resistors 8 and 9.

Any suitable exciter frequency may be used to control the tube 1, the excitation pulses being delivered to the input circuit and across a capacitor 10 for varying the potential drop through resistor 9.

The period of discharge of the tube 1 after excitation may be made relatively brief by the use of a capacitor 11 which is connected in circuit between the anode 3 and ground. This capacitor is indicated as being adjustable in order to provide an optimum discharge period in the tube 1 and to produce a sharply peaked surge impulse. The duration of such an impulse should be commensurate with a half-wave of a desired harmonic frequency which is to be generated by a vacuum tube oscillator in a subsequent stage.

The oscillator circuit may be of any well known design, but as herein shown, it preferably includes a pentode vacuum tube 12. Its cathode 13 and its anode 14 are operably associated with first, second, and third grids 15, 16, and 17 respectively. The cathode 13 is connected through a cathode resistor 18 to the grounded negative terminal —B of a direct current source. Resistor 18 is shunted by a capacitor 19. The grid 15 is self-biased by virtue of the cathode resistor 18 in combination with a grid leak resistor 20.

A resonant circuit is provided consisting of an adjustable capacitor 21 in parallel with the primary winding 22, of an output transformer 23. One terminal of the resonant circuit is connected to the anode 14. The other terminal is coupled across capacitor 24 to grid 15. An intermediate tap on the primary winding 22 is connected to the positive terminal of the direct current source indicated as +B.

The secondary winding 25 of transformer 23 is connected to the output circuit. A by-pass condenser 26 is in shunt with the terminals of the direct current source.

It is a basic requirement that the excitation wave shall be so peaked that its wave form will conform as closely as possible to the harmonic wave form. The more sharply the excitation wave is peaked, the higher will be the obtainable harmonic frequency. Furthermore, the efficiency of the harmonic output generally will be greater in proportion to the sharpness of the excitation wave form. In an ordinary frequency multiplier circuit, a high driving voltage is required against a high bias in order to obtain this peak wave form. A great deal of the energy of such a frequency multiplier is lost because of the necessary dissipation of the wave energy which lies below the critical excitation voltage. If harmonics higher than the third are wanted, efficiency of output is very low, and this efficiency decreases more and more as the order of the desired harmonic is raised. In accordance with my invention, the harmonic oscillator is more efficiently controlled, as will be understood from the following explanation.

In the operation of the embodiment shown in Fig. 1, the values assigned to potentiometer 5 and capacitor 11 are such that the peaked pulses derived from an ignition state in the tube 1 will be of a duration substantially equal to a half-wave length of the chosen harmonic frequency at which oscillations are to be generated by the tube 12. Capacitor 11 is charged while the tube 1 is non-conductive. Excitation is applied to the input circuit of tube 1 across capacitor 10 and resistor 9, causing this tube to ignite. Capacitor 11 then discharges through tube 1 and through cathode resistor 7 and the choke 6. A surge impulse is thereby applied to the screen grid 16 in tube 12, the effect of which will presently be noted.

The oscillator, of which tube 12 is an essential component, is capable of sustaining oscillations at a frequency which is largely determined by the resonant characteristics of its tuned tank circuit 21, 22. The surge impulses applied to the screen grid 16 operate to jerk the oscillator into correct phase relation with the fundamental frequency energy which is used for controlling tube 1.

The resonant circuit of tube 12 may be tuned to any desired harmonic of the frequency of discharge in the tube 1, or it may be tuned to the fundamental frequency thereof. In any event, the pulses from the tube 1 guide the oscillations in tube 12. The charging time for capacitor 11 is relatively slow due to the impedance of potentiometer 5. Its discharge time is, however, very rapid because of the low impedance of the space path in tube 1, when ionization takes place. This tube is so biased that it will ignite only when the grid potential is raised to a positive value with respect to the cathode 2, the potential difference between anode and cathode being sufficiently great. The ignition state is quite transitory, due to the fact that the cathode potential is driven positive considerably above the excitation level. Due to tube and stray capacitances the positive cathode potential persists for a short time after the discharge has been extinguished. This action helps to maintain cut-off while the grid is still on its positive half cycle. The capacitor 11 cannot start recharging until it has been discharged to a basic level such as to quench the ionization discharge in tube 1. Furthermore, the time during which a charge is being built up on capacitor 11 to a sufficient voltage so that tube 1 will re-ignite represents a major portion of the low frequency input cycle.

A detailed description of Figs. 2 and 3 is scarcely necessary because of their similarity to Fig. 1. The differentiating features will, however, be pointed out.

Although a choke 6 is shown in circuit with cathode resistor 7 for tube 1 in Fig. 1, and although this choke 6 serves to produce more sharply peaked pulses to be applied to the grid 16 in tube 12, and it is generally desirable, nevertheless this choke 6 is not always necessary, and in any event, it does not need to be connected between the resistor 7 and ground. In Fig. 2, the choke 6a is connected between the cathode 2 and a potentiometer 7a leading to ground. A tap 7b on potentiometer 7a is connected to the positive terminal of the direct current source +B through a resistor 27. The value of this resistor can be made such that with suitable adjustment of the tap 7b, a positive bias is normally applied to the cathode 2. This bias must be overcome by the input impulse before tube 1 can strike. A blocking condenser 28 is interposed between the cathode 2 in tube 1 and the screen grid 16, since the direct current voltages normally applied to these electrodes must be maintained at different values. Resistor 29 is connected between the positive terminal +B of the direct current source and the screen grid 16.

In Fig. 2, as well as in Fig. 1, the excitation pulses are applied to the screen grid 16, whereas in Fig. 3, they are applied to the first grid 15. The circuit parameters of the oscillation generator, as shown in Figs. 1 and 2, are substantially identical. The operation of the circuit arrangement of Fig. 2 will, therefore, be clear from the description which has been given with respect to Fig. 1.

In some respects the circuit arrangement of Fig. 3 has proven to be more satisfactory than that shown in either of the other two figures. In Fig. 3, the pulses from tube 1 are supplied to the control grid 15 in tube 12, whereas the screen grid 16 is used as a harmonic frequency oscillation grid. The cathode circuit of tube 1 in Fig. 3 is shown as comprising solely the potentiometer 7a whose tap 7b is connected through resistor 27 to the positive terminal +B of the direct current source. However, a choke in the cathode circuit is usually desirable. A variable bias is obtained for tube 1 through adjustment of the tap 7b. The oscillation grid 16 is connected through a resistor 31 with one terminal of the parallel resonant circuit 21, 22, and the resistor 31 is shunted by a capacitor 32. Harmonic frequency power is conserved by the use of the circuit connection shown between grid 16 and the tank circuit. A potentiometer 33 is provided across the terminals of the direct current source for use in obtaining a suitable anode potential for tube 1. The anode potential is fed through a tap 33a which is adjustable on the potentiometer 33 and through adjustable resistor 5a. As shown in Fig. 3, capacitor 11 is connected between the anode 3 and ground. It is made adjustable and serves the same purpose as the corresponding capacitor in the other figures.

Since the tube 1 is controlled by a biased pulsing circuit, it delivers one pulse per cycle of the exciter frequency over a wide range of frequency variation. Consequently it is possible to tune in and control a wide range of harmonic frequencies in the oscillator stage. The locking or controlling effect is practically operable up to the 30th harmonic, as demonstrated by actual tests which have been made with this circuit arrangement.

Modifications of the circuit arrangement which might fall within the scope of my invention may be made by those skilled in the art. Among such modifications, it is apparent that I might, if desired, substitute a vacuum tube in place of the gaseous tube 1. High vacuum pulse circuits are suitable for the generation of pulses of the order of a million per second, whereas, only a relatively low order of pulse frequency is possible, say up to 150,000 pulses per second in a gaseous discharge tube. Another possible variation of the oscillator circuit arrangement may be provided if the oscillator were to be designed to operate two tubes disposed in push-pull relation to one another. As still another modification, the pulse excitation for the oscillator tube 12 may, if desired, be derived from the anode circuit of tube 1 or from an impedance placed in the ground lead of capacitor 11.

The scope of the invention is not, therefore,

I claim:

1. A frequency multiplier comprising space discharge means for producing discrete unilateral pulses having a periodicity equal to the cyclic frequency of a fundamental wave, each pulse being substantially limited in duration to a half wave of a frequency harmonically related to said fundamental wave, an electronic oscillator of the type having an input circuit, said oscillator being tuned to said harmonically related frequency, and means for controlling the frequency of said oscillator by the impress of said pulses upon said input circuit.

2. A frequency multiplier according to claim 1 and including a gaseous discharge tube in the first said means, said tube having a capacitor connected between its anode and ground, an anode circuit impedance and a grounded cathode circuit impedance.

3. A frequency multiplier according to claim 1 and including an inductive reactance in circuit between the cathode of said space discharge means and ground.

4. A stabilized harmonic oscillator having a gaseous triode discharge tube and a multigrid vacuum discharge tube, circuit elements for said tubes so arranged that self-sustained oscillations are generated in the vacuum tube and discrete pulses are delivered to a control grid of said vacuum tube by successive discharges in said gaseous tube, said pulses having a sub-harmonic relation to the frequency of said oscillations, and means including a capacitor in shunt with a circuit which comprises the discharge path of said gaseous tube together with a cathode impedance therefor, whereby the duration of each said pulse is limited to a half-cycle of the generated oscillations.

5. A stabilized harmonic oscillator according to claim 4 and including an external source of oscillations coupled to the input circuit of said gaseous discharge tube for regulating the periodicity of its discharges.

6. A stabilized harmonic oscillator according to claim 4 wherein said control grid in the vacuum tube is the second from the cathode, the first grid being coupled to a resonant output circuit whereby the generated oscillations are self-sustained.

7. A stabilized harmonic oscillator comprising a multigrid vacuum discharge tube, means including a gaseous triode discharge tube for synchronizing the oscillations generated in said vacuum tube, and circuit elements for said tubes so arranged that self-sustained oscillations are generated in the vacuum tube and discrete pulses are delivered to a control grid of said vacuum tube by successive discharges in said gaseous tube, said pulses having a sub-harmonic relation to the frequency of said oscillations, the circuit elements for said gaseous tube including an adjustable impedance connected between its anode and the positive terminal of an operating potential source.

8. A stabilized harmonic oscillator having a multigrid vacuum discharge tube, means including a gaseous triode discharge tube for controlling the frequency of said vacuum discharge tube, circuit elements for said tubes so arranged that self-sustained oscillations are generated in the vacuum tube and discrete pulses are delivered to a control grid of said vacuum tube by successive discharges in said gaseous tube, said pulses having a sub-harmonic relation to the frequency of said oscillations, the circuit elements for said gaseous tube including a cathode resistor in combination with potentiometric means for maintaining the cathode at a normally positive bias with respect to the gaseous tube grid.

9. A stabilized harmonic oscillator having a multigrid vacuum discharge tube, means including a gaseous triode discharge tube for controlling the frequency of said vacuum discharge tube, circuit elements for said tubes so arranged that self-sustained oscillations are generated in the vacuum tube and discrete pulses are delivered to a control grid of said vacuum tube by successive discharges in said gaseous tube, said pulses having a sub-harmonic relation to the frequency of said oscillations, the circuit elements for said vacuum tube including a resonant tank circuit one end of which is connected to the vacuum tube anode, the other end being coupled to an oscillation-controlling grid in said vacuum tube, and an intermediate tap on the inductance of said tank circuit being connected to the positive terminal of an operating potential source.

10. In combination, an electron discharge device having its electrodes regeneratively connected so as to generate an electrical wave of predetermined frequency, a gaseous triode having an anode, a cathode and a grid, means including a time constant circuit connected to the anode-cathode circuit of said triode for limiting the duration of a pulse discharge in said triode to a time interval which is no longer than a half cycle of said predetermined frequency, means for so controlling the excitation of said triode as to maintain a sub-harmonic relation between the periodicity of the triode discharges and said predetermined frequency, and circuit means coupling the output from said triode to a control electrode in said electron discharge device, thereby to stabilize the frequency of the generated wave.

GEORGE L. USSELMAN.

REFERENCES CITED

The following references are of record in the file of this patent:

UNITED STATES PATENTS

| Number | Name | Date |
|---|---|---|
| 2,092,887 | Luck | Sept. 14, 1937 |
| 2,144,779 | Schlesinger | Jan. 24, 1939 |
| 2,162,806 | Fay | June 20, 1939 |
| 2,181,280 | Miller | Nov. 28, 1939 |
| 2,246,534 | Peterson | June 24, 1941 |
| 2,248,481 | Schuttig | July 8, 1941 |

FOREIGN PATENTS

| Number | Country | Date |
|---|---|---|
| 770,241 | France | June 25, 1934 |